(12) United States Patent
Werner et al.

(10) Patent No.: US 12,199,895 B2
(45) Date of Patent: Jan. 14, 2025

(54) CONFIGURING A PLURALITY OF USER EQUIPMENTS

(71) Applicant: Telefonaktiebolaget LM Ericsson (publ), Stockholm (SE)

(72) Inventors: Karl Werner, Segeltorp (SE); Niklas Jaldén, Enköping (SE); Mohammadreza Malek Mohammadi, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 614 days.

(21) Appl. No.: 17/441,137

(22) PCT Filed: Mar. 25, 2019

(86) PCT No.: PCT/EP2019/057470
§ 371 (c)(1),
(2) Date: Sep. 20, 2021

(87) PCT Pub. No.: WO2020/192889
PCT Pub. Date: Oct. 1, 2020

(65) Prior Publication Data
US 2022/0166572 A1    May 26, 2022

(51) Int. Cl.
*H04L 5/00* (2006.01)
*H04W 72/044* (2023.01)
*H04W 72/542* (2023.01)

(52) U.S. Cl.
CPC .......... *H04L 5/0037* (2013.01); *H04L 5/0048* (2013.01); *H04L 5/0064* (2013.01);
(Continued)

(58) Field of Classification Search
CPC ... H04L 5/0037; H04L 5/0048; H04L 5/0064; H04L 5/0092; H04L 25/0226; H04L 5/006; H04L 5/1469; H04L 5/0023; H04L 5/001; H04L 5/0053; H04W 72/044; H04W 72/542; H04W 52/325; H04W 72/0453; H04W 24/10; H04W 72/046;
(Continued)

(56) References Cited

U.S. PATENT DOCUMENTS 6,286,104 B1 *   9/2001   Buhle ................... H04L 63/105
                                                  707/999.009
8,913,584 B2   12/2014   Wang et al.
(Continued)

FOREIGN PATENT DOCUMENTS

WO       2011083986 A2      7/2011

OTHER PUBLICATIONS

International Search Report and Written Opinion dated Nov. 19, 2019 for International Application No. PCT/EP2019/057470 filed Mar. 25, 2021, consisting of 16-pages.

*Primary Examiner* — Brian T O Connor
(74) *Attorney, Agent, or Firm* — Weisberg I.P. Law, P.A.

(57) ABSTRACT

Methods and apparatus are provided for configuring a plurality of User Equipments (UEs) to communicate with a base station. In one example, a method includes determining, for each UE, a respective bandwidth based on an indication of channel quality between the UE and the base station, and configuring at least a subset of the plurality of UEs to communicate with the base station based on the respective bandwidths.

17 Claims, 7 Drawing Sheets

(52) U.S. Cl.
CPC ......... *H04L 5/0092* (2013.01); *H04W 72/044* (2013.01); *H04W 72/542* (2023.01)

(58) Field of Classification Search
CPC ... H04W 72/21; H04B 17/318; H04B 7/0697; H04B 7/0408
See application file for complete search history.

(56) References Cited

U.S. PATENT DOCUMENTS

| | | | |
|---|---|---|---|
| 9,198,189 | B2 | 11/2015 | Cheng et al. |
| 11,044,057 | B2 * | 6/2021 | Asterjadhi ......... H04W 72/0453 |
| 11,431,527 | B2 * | 8/2022 | Zhang ................... H04W 80/08 |
| 11,552,756 | B2 * | 1/2023 | Sha ......................... H04L 5/005 |
| 11,641,594 | B2 * | 5/2023 | Tiirola .................. H04L 5/0048 |
| | | | 370/328 |
| 11,757,680 | B2 * | 9/2023 | Zhang ................... H04L 5/0012 |
| | | | 370/329 |
| 11,831,575 | B2 * | 11/2023 | Sha ....................... H04W 72/04 |
| 11,843,498 | B2 * | 12/2023 | Ko ....................... H04L 27/2657 |
| 2017/0079057 | A1 | 3/2017 | Chen et al. |
| 2024/0048317 | A1 * | 2/2024 | Sha ....................... H04L 25/022 |

* cited by examiner

CONFIGURING A PLURALITY OF USER EQUIPMENTS

CROSS-REFERENCE TO RELATED APPLICATIONS

This application is a Submission Under 35 U.S.C. § 371 for U.S. National Stage Patent Application of International Application Number: PCT/EP2019/057470, filed Mar. 25, 2019 entitled "CONFIGURING A PLURALITY OF USER EQUIPMENTS," the entirety of which is incorporated herein by reference.

TECHNICAL FIELD

Examples of the present disclosure relate to configuring a plurality of User Equipments (UEs) to communicate with a base station.

BACKGROUND

Advanced antenna systems may be used to significantly enhance performance of wireless communication systems in both uplink (UL) and downlink (DL) directions. For example, advanced antennas may provide the possibility of using the spatial domain of the channel to improve reliability and/or throughput of transmissions, for example by directing the radiated energy in space, commonly called beamforming.

To generate the appropriate beam to a specific user (e.g. user equipment, UE), a base station such as a gNB may use information of the propagation channel between base station and the user. In time division duplex (TDD) systems, the uplink and downlink may share the same bandwidth, which allows the base station to obtain channel state information through utilizing reciprocity in the wireless channel. That is, for example, channel state information for the uplink channel may be used for the downlink channel. In some examples, the user may transmit known signals (referred to as reference signals), which the base station then uses to estimate the downlink channel.

The quality of the downlink channel information at the base station is, however, directly dependent on how well the base station estimates the uplink channel, which in turn is closely connected with the power and the bandwidth used by the UE to transmit the reference signal.

In some networks, for example with increasing numbers of users, some users may request data at the same time. The use of advanced antennas and beamforming may allow a base station to reuse the available spectrum and serve two (or more) users at the same time, for example using spatial multiplexing (SDM) or multi-user-multiple-input-multiple-output (MU-MIMO).

SUMMARY

One aspect of the present disclosure provides a method of configuring a plurality of User Equipments (UEs) to communicate with a base station. The method comprises determining, for each UE, a respective bandwidth for a respective reference signal to be transmitted by the UE, wherein the respective bandwidth is determined based on an indication of channel quality between the UE and the base station. The method also comprises configuring the plurality of UEs to communicate with the base station based on the respective bandwidths.

Another aspect of the present disclosure provides apparatus for configuring a plurality of User Equipments (UEs) to communicate with a base station. The apparatus comprises processing circuitry and a memory. The memory contains instructions executable by the processing circuitry such that the apparatus is operable to determine, for each UE, a respective bandwidth for a respective reference signal to be transmitted by the UE, wherein the respective bandwidth is determined based on an indication of channel quality between the UE and the base station, and configure the plurality of UEs to communicate with the base station based on the respective bandwidths.

A further aspect of the present disclosure provides apparatus for configuring a plurality of User Equipments (UEs). The apparatus is configured to determine, for each UE, a respective bandwidth for a respective reference signal to be transmitted by the UE, wherein the respective bandwidth is determined based on an indication of channel quality between the UE and the base station, and configure the plurality of UEs to communicate with the base station based on the respective bandwidths.

In another aspect, a computer program is provided. The computer program comprising instructions which, when executed on at least one processor, cause the at least one processor to perform a method of configuring a plurality of User Equipments (UEs) to communicate with a base station. The method comprises determining, for each UE, a respective bandwidth for a respective reference signal to be transmitted by the UE, wherein the respective bandwidth is determined based on an indication of channel quality between the UE and the base station. The method also comprises configuring the plurality of UEs to communicate with the base station based on the respective bandwidths.

In a further aspect, a carrier containing a computer program is provided wherein the carrier comprises one of an electronic signal, optical signal, radio signal or computer readable storage medium and the computer program comprises instructions which, when executed on at least one processor, cause the at least one processor to perform a method of configuring a plurality of User Equipments (UEs) to communicate with a base station. The method comprises determining, for each UE, a respective bandwidth for a respective reference signal to be transmitted by the UE, wherein the respective bandwidth is determined based on an indication of channel quality between the UE and the base station. The method also comprises configuring the plurality of UEs to communicate with the base station based on the respective bandwidths.

In another aspect a computer program product is provided, wherein the product comprises non transitory computer readable media having stored thereon a computer program comprising instructions which, when executed on at least one processor, cause the at least one processor to perform a method of configuring a plurality of User Equipments (UEs) to communicate with a base station. The method comprises determining, for each UE, a respective bandwidth for a respective reference signal to be transmitted by the UE, wherein the respective bandwidth is determined based on an indication of channel quality between the UE and the base station. The method also comprises configuring the plurality of UEs to communicate with the base station based on the respective bandwidths

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
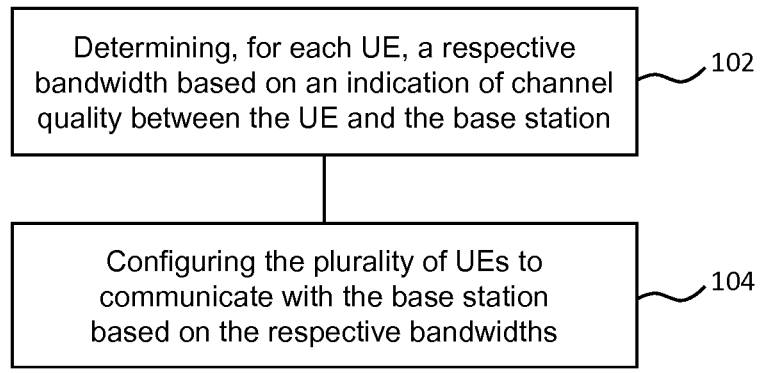
FIG. 1 is a flow chart of an example of a method of configuring a plurality of User Equipments (UEs) to communicate with a base station.

The quality of the downlink channel information at the base station is directly dependent on how well the base station estimates the uplink channel, which in turn is closely connected with the power and the bandwidth used by the UE to transmit the reference signal. One way to increase the quality of the channel estimates is to decrease the bandwidth of the reference signal while maintaining its total power, hence increasing the power spectral density of the reference signal. However, this may limit the bandwidth that the base station may use in downlink transmissions and hence the achievable downlink data rate. One problem considered by the present application is how to optimize data transmissions between a base station and multiple wireless devices without requiring each device to sound the entire available bandwidth. Supplying a base station with channel information, through transmission of a reference signal (e.g. a Sounding Reference Signal, SRS) from one or more users or UEs, on bandwidths larger than what will be used for downlink transmissions may not be efficient use of resources. For example, this may create additional uplink interference and/or may be a non-optimal use of the limited battery power at the terminals.

Embodiments herein provide solutions to optimize the available bandwidth for transmission between a base station and a plurality of UEs by determining/estimating the bandwidth available to a UE for coherent channel estimation. In some embodiments a selection between spatial multiplexing (SDM) or multi-user-multiple-input-multiple-output (MU-MIMO) and using frequency division multiplexing (FDM) is provided in order to achieve an optimal transmission rate. Some of the advantages provided by one or more of the embodiments herein are limiting sounding to useable bandwidths thereby improving resource allocation, reducing processing power and improving throughput. The selection of SDM versus FDM may be optimized based on additional factors combined with the estimated channel sounding bandwidth, for example, where two or more users are only able to transmit reference signals on parts of the available bandwidth, or are requesting small amounts of data, these users may be scheduled for downlink transmissions on separate resources using frequency division multiplexing (FDM).

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause processing circuitry to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Spatial multiplexing (SDM) has the potential of increasing downlink spectral efficiency by up to N times (where N is the number of co-scheduled users/layers) and is hence preferable over FDM in some examples when attempting to increase or maximize network capacity.

To allow spatial multiplexing of two or more users (e.g. UEs), the base station may use channel information for all users. In cases where the two or more users cannot transmit a reference signal across the entire bandwidth reliably, the base station may assign uplink reference signal bandwidths for each user. In some examples, the base station may wish to assign uplink reference signal resources for one or more users prior to obtaining channel information.

FIG. 1 is a flow chart of an example of a method 100 of configuring a plurality of User Equipments (UEs) to communicate with a base station. In some examples, the method 100 is carried out by the base station or another network node. The method 100 comprises, in step 102, determining, for each UE, a respective bandwidth based on an indication of channel quality between the UE and the base station. The indication of channel quality may in some examples indicate an uplink channel quality, which may also be applied to the downlink channel using channel reciprocity. The method 100 also comprises, in step 104, configuring at least a subset of the plurality of UEs to communicate with the base station based on the respective bandwidths (e.g. based on a total or sum of the respective bandwidths of all of the UEs). That is, for example, uplink and/or downlink communication for each UE may be configured for each UE. In some examples, configuring each UE may comprise configuring a reference signal transmitted by the UE, and/or may comprise configuring a downlink transmission mode. The at least a subset of UEs may comprise for example one of the UEs, multiple UEs or all of the UEs.

The respective bandwidth for a UE may in some examples be the bandwidth for downlink communication from the base station to the UE. Therefore, determining, for each UE, a respective bandwidth comprises determining, for each UE, the respective bandwidth for a respective downlink signal from the base station to the UE. Additionally or alternatively, the respective bandwidth for a UE may be in some examples be a bandwidth for a reference signal, such as a sounding reference signal (SRS). Therefore, wherein determining, for each UE, a respective bandwidth comprises determining, for each UE, the respective bandwidth for a respective reference signal to be transmitted by the UE.

When the bandwidth of a reference signal transmitted by a UE is increased while the total transmit power is substantially the same, the signal-to noise ratio (SNR) or signal-to-interference-and-noise ratio (SINR) will decrease at the receiver. This may be because the noise spectral density (noise power density in frequency domain) is fixed, so for example if the bandwidth of the reference signal is doubled, the noise power doubles as well. In some examples, the method determines the largest possible bandwidth for a reference signal for each UE such that a predetermined minimum SNR (or SINR) level can be maintained at the base station for the reference signals. Furthermore, a larger bandwidth may lead to higher throughput for the UE, e.g. by using a larger downlink bandwidth.

In some examples, the purpose of the SRS transmitted by a UE is for the base station to receive a known signal from the UE, which may be used to estimate the channel characteristics (channel information) between the UE and the base station. In some examples, channel reciprocity is assumed, i.e. that the uplink channel characteristics are similar to or the same as the downlink channel characteristics. Thus, for example, the SRS transmitted by the UE may be used to determine downlink channel characteristics.

In some examples, configuring the at least a subset of plurality of UEs to communicate with the base station based on the respective bandwidths comprises configuring, for each UE of the at least a subset, the UE to transmit a reference signal based on the respective bandwidths. The reference signal may be for example a Sounding Reference Signal (SRS). In some examples, each UE is configured to transmit the reference signal using the respective bandwidth. For example, configuring, for each UE of the at least a subset, the UE to transmit a reference signal based on the respective bandwidths comprises, for each UE of the at least a subset, allocating resources for the respective reference signal to be transmitted by the UE based on the respective bandwidth such that the respective reference signal having the respective bandwidth transmitted by the UE at a respective total transmission power is received at the base station with a signal-to-noise ratio (SNR) or signal-to-interference-and-noise (SINR) of at least a threshold value. In this way, for example, the method may ensure that the reference signal is received (e.g. at a base station) with a certain quality, whilst also ensuring a wide bandwidth (e.g. the bandwidth is as wide as possible whilst also ensuring a minimum SNR or SINR). In some examples, the threshold SNR or SINR value may be −15 dB. Each UE of the at least a subset may then be configured to transmit the respective reference signal using the allocated resources.

Allocating resources for the respective reference signal for each UE of the at least a subset may in some examples comprise selecting, for each UE of the at least a subset, a number of subcarriers for the respective reference signal, selecting a frequency bandwidth for the respective reference signal, and/or selecting a frequency difference between a highest and a lowest subcarrier for the respective reference signal. Thus, for example, the frequency bandwidth may correspond to the respective bandwidth for each UE. The reference signal may include contiguous subcarriers, or alternatively may include non-contiguous subcarriers. For example, the reference signal may be transmitted by a UE using the respective bandwidth but at least one subcarrier within that bandwidth is not used to transmit the reference signal. In some examples, where the total transmission power of the reference signal is a certain value, omitting one or more subcarriers in this way may allow an increase in transmission power for the subcarriers that are actually used to transmit the reference signal.

The respective bandwidth for each UE may be determined in some examples based on a total transmission power of the respective reference signal and/or a noise level at the base station. For example, the method may use the total transmission power (and in some examples also the channel quality or path loss) to determine the respective bandwidth for a UE and configure communication between the UE and the base station, e.g. to adjust the resources selected for the uplink reference signal, and/or to select the downlink transmission mode and/or bandwidth.

In some examples of the method 100, configuring the at least a subset of the plurality of UEs to communicate with the base station based on the respective bandwidths comprises selecting, for each UE of the at least a subset, a respective downlink transmission mode based on the respective bandwidths. For example, selecting, for each UE of the at least a subset, the respective downlink transmission mode based on the respective bandwidths comprises selecting, for each UE of the at least a subset, frequency division multiplexing (FDM) and/or spatial division multiplexing (SDM) for downlink transmissions to the UE based on the respective bandwidths. In some examples, where a total or sum of the respective bandwidths for a plurality of UEs is not greater than a total available bandwidth for communicating with the UEs, frequency multiplexing (FDM) may be selected for downlink transmissions, which may be simultaneous, to those UEs of the at least a subset. In some examples, the bandwidth used for respective downlink transmissions for each UE of the at least a subset may use the respective bandwidth determined in step 102 of the method 100 (e.g. in a scenario that uses reciprocity between the uplink and downlink channels for the UE).

Figure 2:
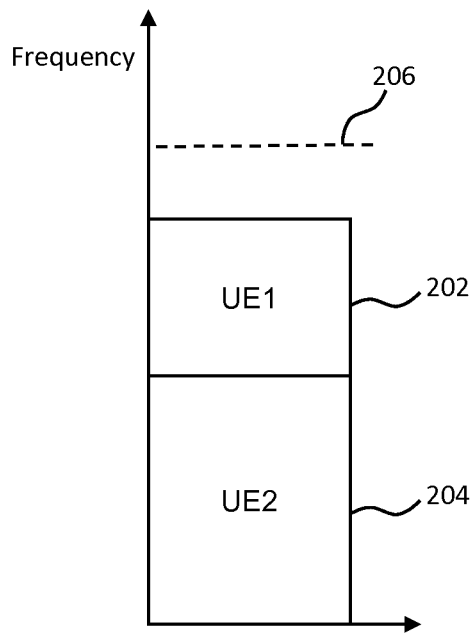
FIG. 2 shows an example of downlink transmissions in a scenario where frequency multiplexing (FDM) is selected for two UEs.

Therefore, some examples of the method 100 may comprise selecting, for each UE of the at least a subset, FDM for downlink transmissions if a total of the respective bandwidths is not greater than the total available bandwidth for simultaneous downlink transmissions to the plurality of UEs. FIG. 2 shows an example of downlink transmissions in this scenario, where FDM is selected for two UEs. As shown, downlink transmissions 202 for a first UE (UE1) can be frequency multiplexed with simultaneous downlink transmissions 204 for a second UE (UE2) as the total of the bandwidths used is less than a total available bandwidth 206. In this example, SDM (e.g. beamforming) may or may not be used for the downlink transmissions.

Figure 3:
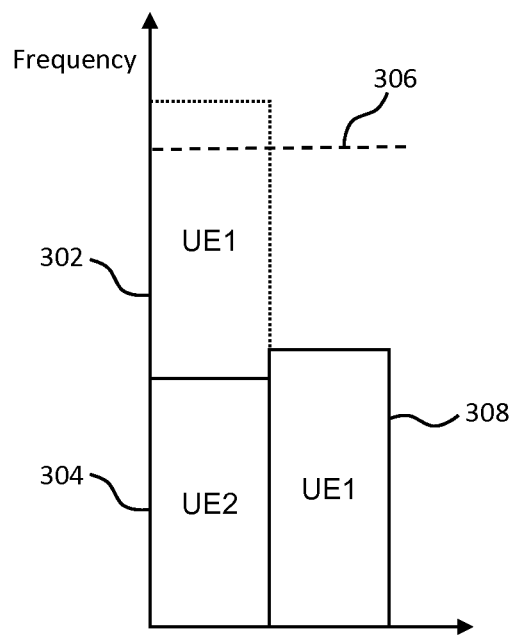
FIG. 3 shows an example of downlink transmissions in a scenario where spatial multiplexing (SDM) is selected for two UEs.

The method 100 may also comprise, in some examples, selecting SDM (e.g. beamforming) for downlink transmissions for at least two of the UEs of the at least a subset if a total of the respective bandwidths is greater than the total available bandwidth for simultaneous downlink transmissions to the plurality of UEs. FIG. 3 shows an example of downlink transmissions in this scenario, where SDM is selected for two UEs. As shown, if downlink transmissions 302 for a first UE (UE1) are frequency multiplexed with simultaneous downlink transmissions 304 for a second UE (UE2), the total of the bandwidths used is greater than a total available bandwidth 306. Hence, the downlink transmissions 302 are not frequency multiplexed with the downlink transmissions 304, and are shown with dashed lines illustrating that they are not transmitted in this way. Instead, downlink transmissions 308 for UE1 are spatially multiplexed with the simultaneous downlink transmissions 304 for UE2 as shown, alongside transmissions 304 for UE2 to illustrate spatial multiplexing of these transmissions. For example, beamforming may be used for transmissions to both UEs. In the example shown, substantially the same frequency resources are used for downlink transmissions to both UEs (e.g. the frequency resources used for transmissions to UE2 include all of the frequency resources used for transmissions to UE1), though in other examples the frequency resources used may have less overlap and/or may be discontinuous to either or both UEs.

Figure 4:
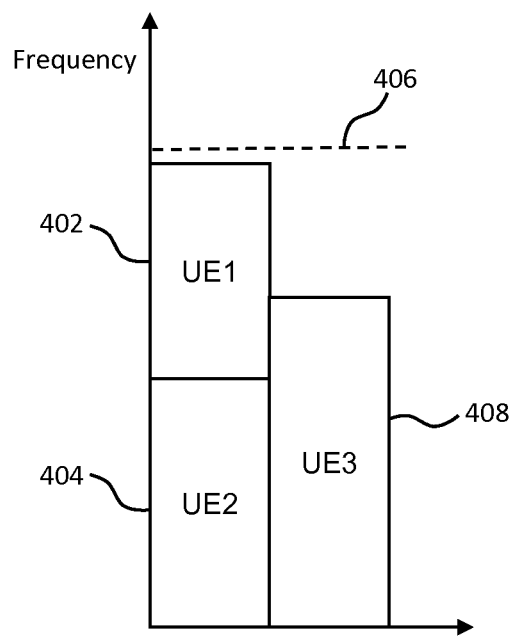
FIG. 4 shows an example of downlink transmissions to three UEs in another scenario.

FIG. 4 shows an example of downlink transmissions to three UEs in another scenario. In this scenario, downlink transmissions 402 to a first UE (UE1) and downlink transmissions 404 to a second UE (UE2) are configured to use FDM as their total bandwidths are less than a total available bandwidth 406. Furthermore, these transmissions are spatially multiplexed with downlink transmissions 408 to a third UE, UE3 (which are shown alongside transmissions 402 and 404 to illustrate spatial multiplexing), as the total bandwidth for all three UEs is greater than the total available bandwidth 406. In other examples, there may be any number of UEs that may use any suitable combination of FDM and/or SDM. Additionally or alternatively, downlink transmissions to one or more UEs may be distributed further over time where the use of FDM and/or SDM alone does not allow simultaneous transmissions to all UEs (e.g. UEs that are requesting data).

In some examples, SDM is selected for at least two of the UEs of the at least a subset if downlink transmissions of the at least two of the UEs cannot be multiplexed using FDM.

In some examples of the method 100, the indication of channel quality comprises an indication of path loss between the UE and the base station (e.g. a path loss from the base station to the UE). This may be determined in some examples from a respective measurement report from the UE, e.g. that indicates a measurement of a signal from the base station to the UE. In other examples, the path loss may be determined based on a measurement of a signal from the UE to the base station, and channel reciprocity may be used to assume that the path loss is the same in the reverse direction, i.e. from the base station to the UE. Thus, in some examples, for each UE, uplink and downlink transmissions between the UE and the base station are time division multiplexed An example implementation will now be described. Example embodiments disclosed herein include a method for configuring one or more UEs, for example allocating UL sounding resources (e.g. resources for a SRS), and hence DL bandwidth allocation, for one or more UEs for selection of and/or dynamic switching between FDM and SDM based on SRS coverage. Steps of the example method are as follows, and may in some examples be implemented by a base station (e.g. a gNB) or other network node.
1. Obtain measurements of path loss to all the UEs that are candidate for DL transmissions.
   a. The path loss can be obtained in some examples from UE reports on received DL power, together with knowledge of DL beamforming gains (used for the channel for which the UE estimates received power) and available UE transmit power (available through for example UE power headroom reports)
2. Obtain estimates of the noise at the base station. This can be done by the base station for example by measuring the UL power in resources where there are no transmissions scheduled, or power received in beamspace for directions where no transmissions are usually coming from, e.g. from the sky, scaled with the processing gains of beamspace.
3. Given the path loss estimates from step 1 and noise estimates from step 2, the per-element SNR (or SINR) can be determined at the base station as a function of the UE transmission power and allocated SRS bandwidth.
4. Optionally, obtain a coarse directional estimate for each user. This may be determined from the particular signal the UE measured and reported on (if beamformed), or a coarse direction of arrival (DoA) estimation of any previous UL signal.
5. The maximum reference signal (e.g. SRS) bandwidth (BW), $BW_{SRS}^i$ is calculated for each of the n users or UEs (i=1, 2, . . . , n) such that reliable channel estimation at the base station will be obtained. For example, a reasonable per-antenna SNR threshold of a reference signal from the UE received at the base station is at least −15 dB.
6. Based on the calculated reference signal bandwidths, a UE frequency allocation is determined. For example, based on the sum of the SRS bandwidths $BW_{sum} = \Sigma_i^n BW_{SRS}^i$ a decision is taken on whether FDM or SDM is used to communicate with the UEs. For example:
   a. If the sum of the bandwidths $BW_{sum} = \Sigma_i^n BW_{SRS}^i$ is larger than the available BW, SDM is selected.
   b. If the sum of the bandwidths $BW_{sum} = \Sigma_i^n BW_{SRS}^i$ is less than (or, in some examples, equal to) the available BW, FDM is selected.
   c. In other examples, both SDM and FDM may be used, e.g. for three or more users, where for example downlink transmissions for two or more users may be frequency multiplexed, and these may also be spatially multiplexed with one or more other users.

In a particular example to determine the maximum SRS bandwidth for a user, a base station (referred to as a gNB as an example) transmits with a maximum power of $P_{Tx}$=43 dBm, evenly spread over a 10 MHz channel (with 50 resource blocks and $N_{sc}$=600 subcarriers), with a beam that has on average $G_{BF}$=8 dB beamforming gain. A UE reports a −117 dB reference signal received power (also known as RSRP) $P_{RSRP}$ value. The received power, $P_{RSRP}$, at the UE should be:

$$PRSRP = P_{Tx} + G_{BF} - PL - 10 * \log_{10}(N_{sc})$$

allowing the base station to determine the path loss between the base station and the UE to be PL=−124 dB. If the minimum SINR threshold for a SRS transmitted on the uplink to the base station, $SINR_{Th} \geq -15$ dB, the SINR threshold can be represented as:

$$SINR_{Th} > P_{UE} - N_{UL} - PL - 10 \log_{10}(N_{SC-UL}),$$

where $N_{UL}$ denotes the UL noise level, and $P_{UE}$ represents the UE's maximum transmission power. The number of subcarriers to allocate for the uplink SRS is then:

$$N_{SC-UL} = 10^{((SINR_{Th} - P_{UE} + N_{UL} + PL)/10)}.$$

Assuming a known UL noise level of $N_{UL}$=−110 dB, and further knowing that the UE's maximum transmission power (for at least the SRS) is $P_{UE}$=23 dBm, the number of subcarriers to allocate for the UL, $N_{SC\text{-}UL}$ (i.e., $BW_{SRS}^i$), becomes 300, giving a bandwidth of 5 HMz.

In a first example, a total of 10 MHz bandwidth is available for transmission. Two users (e.g. UEs) are requesting data simultaneously. The base station measures the path loss to each of the users and determines (for example using the equations above) that the bandwidths for $UE_i$ where i=1, 2 are $BW_{SRS}^1$=4 MHz, $BW_{SRS}^2$=5 MHz. The sum of these is 9 MHz, which is less than the available bandwidth. Hence the two users will be allocated on separate frequency resources according to FDM for downlink transmissions to these users.

In a second embodiment, a total of 10 MHz bandwidth is available for transmission. Two users are requesting data simultaneously. The base station measures the path loss to each of the users and determines that the respective bandwidths for $UE_i$, where i=1, 2 are $BW_{SRS}^1$=10 MHz, $BW_{SRS}^2$=12 MHz. The bandwidth for $UE_2$ is above the available bandwidth, hence this is capped to the maximum available bandwidth of 10 MHz. The sum of the respective bandwidths for the two users (including the capped bandwidth for $UE_2$) is 20 MHz, which is twice the available bandwidth. Hence, downlink transmissions to the two users will use SDM, and may in some examples be allocated the same frequency resources.

In a third example, a total of 10 MHz is available for transmission. Three users are requesting data simultaneously. The base station measures the path loss to each of the users and determines that the respective bandwidths for $UE_i$ where 1=1, 2, 3 are $BW_{SRS}^1$=7 MHz, $BW_{SRS}^2$=3 MHz and $BW_{SRS}^3$=7 MHz. Downlink transmissions may use a combination of FDM and SDM to these users in this example. In an example of allocation of resources or selection of downlink transmission modes, transmissions to $UE_2$ and $UE_3$ may be frequency multiplexed, for example on the same beam, and these may be spatially multiplexed with transmissions to $UE_1$.

In a fourth example, a total of 10 MHz is available for transmission. Four users are requesting data simultaneously. The base station measures the path loss to each of the users and determines that the respective bandwidths for $UE_i$ are $BW_{SRS}^i$=5 MHz, where i=1, 2, 3, 4. $UE_1$ and $UE_3$ are spatially compatible, and $UE_2$ and $UE_4$ are spatially compatible. That is, for example, simultaneous transmissions to $UE_1$ and $UE_3$ can be spatially multiplexed, and simultaneous transmissions to $UE_2$ and $UE_4$ can be spatially multiplexed. With this information, $UE_1$ and $UE_3$ are spatially multiplexed on the same frequency resources, whereas $UE_2$ and $UE_4$ are spatially multiplexed on the same frequency resources. Further, $UE_1$ and $UE_4$ are frequency multiplexed, and $UE_2$ and $UE_3$ are frequency multiplexed.

In a fifth example, a total of 10 MHz is available for transmission. Three users are requesting data simultaneously. The base station measures the path loss to each of the users and determines that the respective bandwidths for $UE_i$, where i=1, 2, 3 are $BW_{SRS}^1$=7 MHz, $BW_{SRS}^2$=8 MHz and $BW_{SRS}^3$=5 MHz. None of the UEs are, however, deemed to be spatially compatible, and therefore the choice of multiplexing is FDM. In a first transmission time period, $UE_1$ is scheduled with $UE_3$ using FDM. All the data for $UE_1$ is sent in this time period, but $UE_3$ still has data to receive at the end of this time period. Thus, in a second time period, the remainder of the data for $UE_3$ is sent to $UE_3$ and transmissions to UE3 are frequency multiplexed with transmissions to $UE_2$. In some examples, $UE_3$ may not need to resend the reference signal (e.g. SRS) if the channel is deemed to be good enough to be used in two consecutive transmissions without resending the reference signal.

Figure 5:
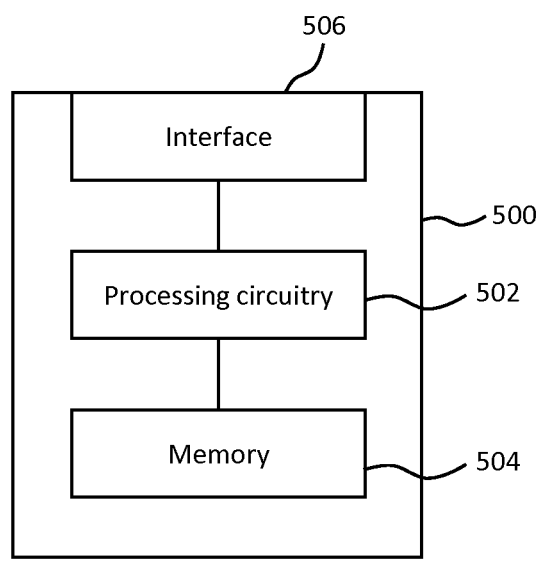
FIG. 5 shows an example of an apparatus for configuring a plurality of UEs to communicate with a base station.

FIG. 5 shows an example of an apparatus 500 for configuring a plurality of User Equipments (UEs) to communicate with a base station. In some embodiments, the apparatus 500 may comprise or be incorporated in a base station such as a gNB. In some examples, the apparatus 500 may be configured to perform the method 100 described above with reference to FIG. 5, or any of the other examples described herein.

The apparatus 500 comprises processing circuitry 502 (e.g. one or more processors) and a memory 504 in communication with the processing circuitry 502. The memory 504 contains instructions executable by the processor 502. The apparatus 500 also comprises an interface 506 in communication with the processing circuitry 502. Although the interface 506, processing circuitry 502 and memory 504 are shown connected in series, these may alternatively be interconnected in any other way, for example via a bus.

In one embodiment, the memory 504 containing instructions executable by the processor 502 such that the apparatus is operable to determine, for each UE, a respective bandwidth for a respective reference signal to be transmitted by the UE, wherein the respective bandwidth is determined based on an indication of channel quality between the UE and the base station, and configure the plurality of UEs to communicate with the base station based on the respective bandwidths.

Figure 6:
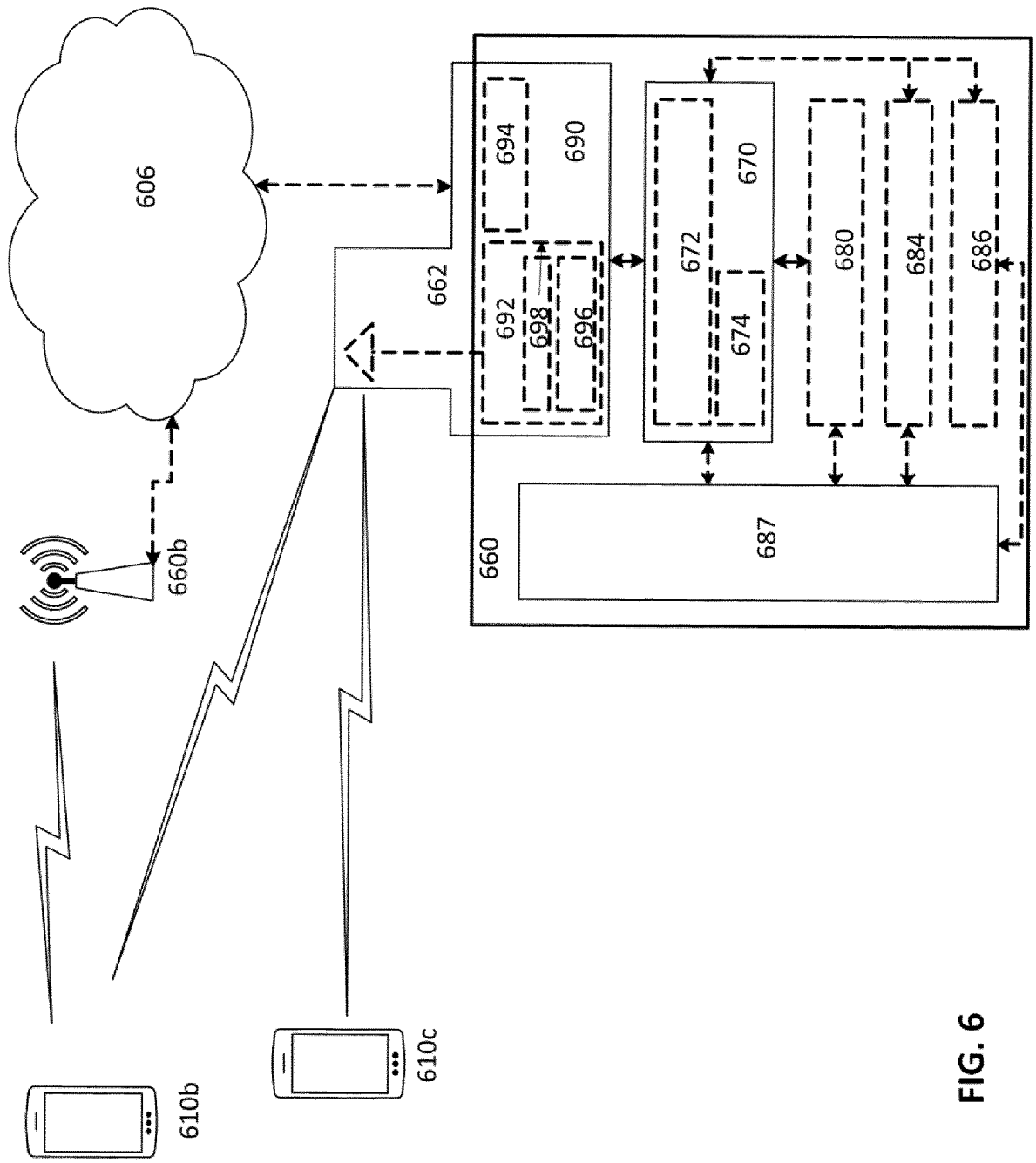
FIG. 6 shows an example of a wireless network and network node structure.

Although the subject matter described herein may be implemented in any appropriate type of system using any suitable components, embodiments disclosed herein are described in relation to a wireless network, such as the example wireless network illustrated in FIG. 6. For simplicity, the wireless network of FIG. 6 only depicts network 606, network nodes 660 and 660b, and wireless devices (WDs) 610, 610b, and 610c, e.g. User Equipments (UEs). In practice, a wireless network may further include any additional elements suitable to support communication between wireless devices or between a wireless device and another communication device, such as a landline telephone, a service provider, or any other network node or end device. Of the illustrated components, network node 6660 is depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 606 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 660 comprises various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points) and base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, network node 660 includes processing circuitry 670, device readable medium 680, interface 690, auxiliary equipment 684, power source 686, power circuitry 687, and antenna 662. Although network node 660 illustrated in the example wireless network of FIG. 6 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 660 are depicted as single boxes located within a larger box, or nested within multiple boxes, in practice, a network node may comprise multiple different physical components that make up a single illustrated component (e.g., device readable medium 680 may comprise multiple separate hard drives as well as multiple RAM modules).

Similarly, network node 660 may be composed of multiple physically separate components (e.g., a NodeB component and a RNC component, or a BTS component and a BSC component, etc.), which may each have their own respective components. In certain scenarios in which network node 660 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 660 may be configured to support multiple radio access technologies (RATs). In such embodiments, some components may be duplicated (e.g., separate device readable medium 680 for the different RATs) and some components may be reused (e.g., the same antenna 662 may be shared by the RATs). Network node 660 may also include multiple sets of the various illustrated components for different wireless technologies integrated into network node 660, such as, for example, GSM, WCDMA, LTE, NR, WiFi, or Bluetooth wireless technologies. These wireless technologies may be integrated into the same or different chip or set of chips and other components within network node 660.

Processing circuitry 670 is configured to perform any determining, calculating, or similar operations (e.g., certain obtaining operations) described herein as being provided by a network node. These operations performed by processing circuitry 670 may include processing information obtained by processing circuitry 670 by, for example, converting the obtained information into other information, comparing the obtained information or converted information to information stored in the network node, and/or performing one or more operations based on the obtained information or converted information, and as a result of said processing making a determination.

Processing circuitry 670 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 660 components, such as device readable medium 680, network node 660 functionality. For example, processing circuitry 670 may execute instructions stored in device readable medium 680 or in memory within processing circuitry 670. Such functionality may include providing any of the various wireless features, functions, or benefits discussed herein. In some embodiments, processing circuitry 670 may include a system on a chip (SOC).

In some embodiments, processing circuitry 670 may include one or more of radio frequency (RF) transceiver circuitry 672 and baseband processing circuitry 674. In some embodiments, radio frequency (RF) transceiver circuitry 672 and baseband processing circuitry 674 may be on separate chips (or sets of chips), boards, or units, such as radio units and digital units. In alternative embodiments, part or all of RF transceiver circuitry 672 and baseband processing circuitry 674 may be on the same chip or set of chips, boards, or units.

In certain embodiments, some or all of the functionality described herein as being provided by a network node, base station, eNB or other such network device may be performed by processing circuitry 670 executing instructions stored on device readable medium 680 or memory within processing circuitry 670. In alternative embodiments, some or all of the functionality may be provided by processing circuitry 670 without executing instructions stored on a separate or discrete device readable medium, such as in a hard-wired manner. In any of those embodiments, whether executing instructions stored on a device readable storage medium or not, processing circuitry 670 can be configured to perform the described functionality. The benefits provided by such functionality are not limited to processing circuitry 670 alone or to other components of network node 660, but are enjoyed by network node 660 as a whole, and/or by end users and the wireless network generally.

Device readable medium 680 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 670. Device readable medium 680 may store any suitable instructions, data or information, including a computer program, software, an application including one or more of logic, rules, code, tables, etc. and/or other instructions capable of being executed by processing circuitry 670 and, utilized by network node 660. Device readable medium 680 may be used to store any calculations made by processing circuitry 670 and/or any data received via interface 690. In some embodiments, processing circuitry 670 and device readable medium 680 may be considered to be integrated.

Interface 690 is used in the wired or wireless communication of signalling and/or data between network node 660, network 606, and/or WDs 610. As illustrated, interface 690 comprises port(s)/terminal(s) 694 to send and receive data, for example to and from network 606 over a wired connection. Interface 690 also includes radio front end circuitry 692 that may be coupled to, or in certain embodiments a part of, antenna 662. Radio front end circuitry 692 comprises filters 698 and amplifiers 696. Radio front end circuitry 692 may be connected to antenna 662 and processing circuitry 670. Radio front end circuitry may be configured to condition signals communicated between antenna 662 and processing circuitry 670. Radio front end circuitry 692 may receive digital data that is to be sent out to other network nodes or WDs via a wireless connection. Radio front end circuitry 692 may convert the digital data into a radio signal having the appropriate channel and bandwidth parameters using a combination of filters 698 and/or amplifiers 696. The radio signal may then be transmitted via antenna 662. Similarly, when receiving data, antenna 662 may collect radio signals which are then converted into digital data by radio front end circuitry 692. The digital data may be passed to processing circuitry 670. In other embodiments, the interface may comprise different components and/or different combinations of components.

In certain alternative embodiments, network node 660 may not include separate radio front end circuitry 692, instead, processing circuitry 670 may comprise radio front end circuitry and may be connected to antenna 662 without separate radio front end circuitry 692. Similarly, in some embodiments, all or some of RF transceiver circuitry 672 may be considered a part of interface 690. In still other embodiments, interface 690 may include one or more ports or terminals 694, radio front end circuitry 692, and RF transceiver circuitry 672, as part of a radio unit (not shown), and interface 690 may communicate with baseband processing circuitry 674, which is part of a digital unit (not shown).

Antenna 662 may include one or more antennas, or antenna arrays, configured to send and/or receive wireless signals. Antenna 662 may be coupled to radio front end circuitry 690 and may be any type of antenna capable of transmitting and receiving data and/or signals wirelessly. In some embodiments, antenna 662 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 662 may be separate from network node 660 and may be connectable to network node 660 through an interface or port.

Antenna 662, interface 690, and/or processing circuitry 670 may be configured to perform any receiving operations and/or certain obtaining operations described herein as being performed by a network node. Any information, data and/or signals may be received from a wireless device, another network node and/or any other network equipment. Similarly, antenna 662, interface 690, and/or processing circuitry 670 may be configured to perform any transmitting operations described herein as being performed by a network node. Any information, data and/or signals may be transmitted to a wireless device, another network node and/or any other network equipment.

Power circuitry 687 may comprise, or be coupled to, power management circuitry and is configured to supply the components of network node 660 with power for performing the functionality described herein. Power circuitry 687 may receive power from power source 686. Power source 686 and/or power circuitry 687 may be configured to provide power to the various components of network node 660 in a form suitable for the respective components (e.g., at a voltage and current level needed for each respective component). Power source 686 may either be included in, or external to, power circuitry 687 and/or network node 660. For example, network node 660 may be connectable to an external power source (e.g., an electricity outlet) via an input circuitry or interface such as an electrical cable, whereby the external power source supplies power to power circuitry 687. As a further example, power source 686 may comprise a source of power in the form of a battery or battery pack which is connected to, or integrated in, power circuitry 687. The battery may provide backup power should the external power source fail. Other types of power sources, such as photovoltaic devices, may also be used.

Alternative embodiments of network node 660 may include additional components beyond those shown in FIG. 6 that may be responsible for providing certain aspects of the network node's functionality, including any of the functionality described herein and/or any functionality necessary to support the subject matter described herein. For example, network node 660 may include user interface equipment to allow input of information into network node 660 and to allow output of information from network node 660. This may allow a user to perform diagnostic, maintenance, repair, and other administrative functions for network node 660.

Figure 7:
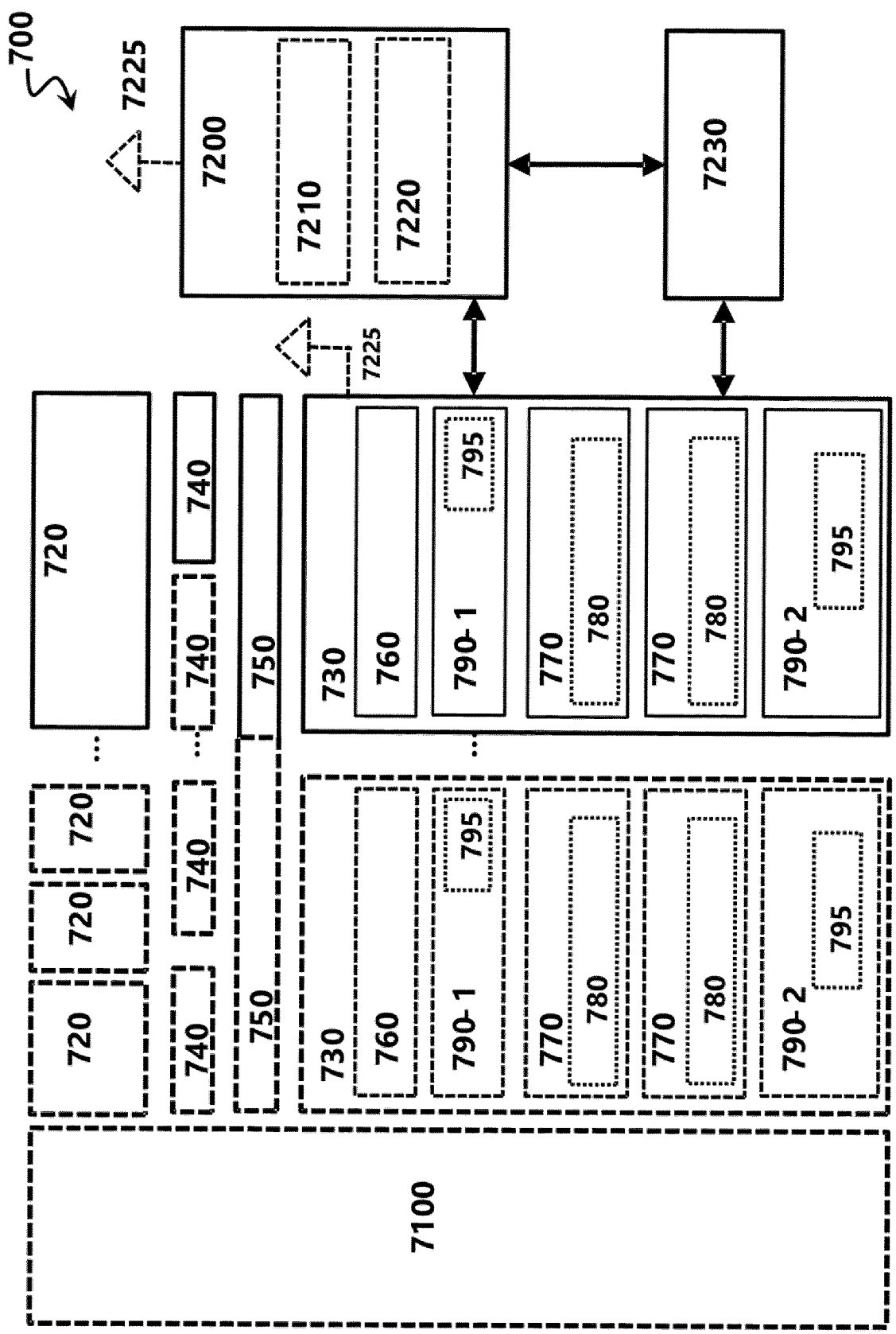
FIG. 7 is a schematic block diagram illustrating a virtualization environment.

FIG. 7 is a schematic block diagram illustrating a virtualization environment 700 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 700 hosted by one or more of hardware nodes 730. Further, in embodiments in which the virtual node is not a radio access node or does not require radio connectivity (e.g., a core network node), then the network node may be entirely virtualized.

The functions may be implemented by one or more applications 720 (which may alternatively be called software instances, virtual appliances, network functions, virtual nodes, virtual network functions, etc.) operative to implement some of the features, functions, and/or benefits of some of the embodiments disclosed herein. Applications 720 are run in virtualization environment 700 which provides hardware 730 comprising processing circuitry 760 and memory 790. Memory 790 contains instructions 795 executable by processing circuitry 760 whereby application 720 is operative to provide one or more of the features, benefits, and/or functions disclosed herein.

Virtualization environment 700, comprises general-purpose or special-purpose network hardware devices 730 comprising a set of one or more processors or processing circuitry 760, which may be commercial off-the-shelf (COTS) processors, dedicated Application Specific Integrated Circuits (ASICs), or any other type of processing circuitry including digital or analog hardware components or special purpose processors. Each hardware device may comprise memory 790-1 which may be non-persistent memory for temporarily storing instructions 795 or software executed by processing circuitry 760. Each hardware device may comprise one or more network interface controllers (NICs) 770, also known as network interface cards, which include physical network interface 780. Each hardware device may also include non-transitory, persistent, machine-readable storage media 790-2 having stored therein software 795 and/or instructions executable by processing circuitry 760. Software 795 may include any type of software including software for instantiating one or more virtualization layers 750 (also referred to as hypervisors), software to execute virtual machines 740 as well as software allowing it to execute functions, features and/or benefits described in relation with some embodiments described herein.

Virtual machines 740, comprise virtual processing, virtual memory, virtual networking or interface and virtual storage, and may be run by a corresponding virtualization layer 750 or hypervisor. Different embodiments of the instance of virtual appliance 720 may be implemented on one or more of virtual machines 740, and the implementations may be made in different ways.

During operation, processing circuitry 760 executes software 795 to instantiate the hypervisor or virtualization layer 750, which may sometimes be referred to as a virtual machine monitor (VMM). Virtualization layer 750 may present a virtual operating platform that appears like networking hardware to virtual machine 740.

As shown in FIG. 7, hardware 730 may be a standalone network node with generic or specific components. Hardware 730 may comprise antenna 7225 and may implement some functions via virtualization. Alternatively, hardware 730 may be part of a larger cluster of hardware (e.g. such as in a data center or customer premise equipment (CPE)) where many hardware nodes work together and are managed via management and orchestration (MANO) 7100, which, among others, oversees lifecycle management of applications 720.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 740 may be a software implementation of a physical machine that runs programs as if they were executing on a physical, non-virtualized machine. Each of virtual machines 740, and that part of hardware 730 that executes that virtual machine, be it hardware dedicated to that virtual machine and/or hardware shared by that virtual machine with others of the virtual machines 740, forms a separate virtual network elements (VNE).

Still in the context of NFV, Virtual Network Function (VNF) is responsible for handling specific network functions that run in one or more virtual machines 740 on top of hardware networking infrastructure 730 and corresponds to application 720 in FIG. 7.

In some embodiments, one or more radio units 7200 that each include one or more transmitters 7220 and one or more receivers 7210 may be coupled to one or more antennas 7225. Radio units 7200 may communicate directly with hardware nodes 730 via one or more appropriate network interfaces and may be used in combination with the virtual components to provide a virtual node with radio capabilities, such as a radio access node or a base station.

In some embodiments, some signalling can be effected with the use of control system 7230 which may alternatively be used for communication between the hardware nodes 730 and radio units 7200.

Figure 8:
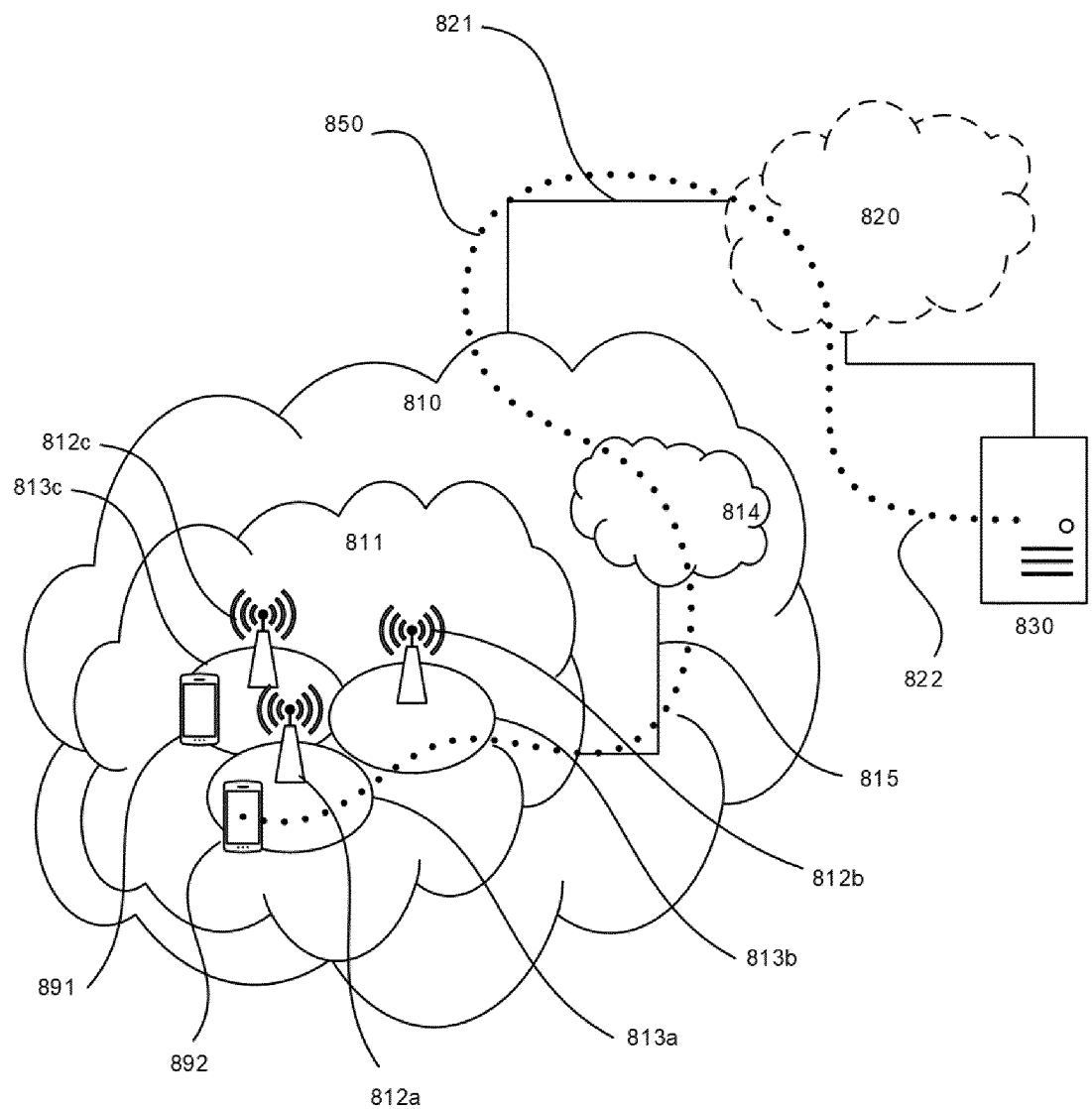
FIG. 8 shows a telecommunication network connected via an intermediate network to a host computer in accordance with some embodiments of the disclosure.

With reference to FIG. 8, in accordance with an embodiment, a communication system includes telecommunication network 810, such as a 3GPP-type cellular network, which comprises access network 811, such as a radio access network, and core network 814. Access network 811 comprises a plurality of base stations 812a, 812b, 812c, such as NBs, eNBs, gNBs or other types of wireless access points, each defining a corresponding coverage area 813a, 813b, 813c. Each base station 812a, 812b, 812c is connectable to core network 814 over a wired or wireless connection 815. A first UE 891 located in coverage area 813c is configured to wirelessly connect to, or be paged by, the corresponding base station 812c. A second UE 892 in coverage area 813a is wirelessly connectable to the corresponding base station 812a. While a plurality of UEs 891, 892 are illustrated in this example, the disclosed embodiments are equally applicable to a situation where a sole UE is in the coverage area or where a sole UE is connecting to the corresponding base station 812.

Telecommunication network 810 is itself connected to host computer 830, which may be embodied in the hardware and/or software of a standalone server, a cloud-implemented server, a distributed server or as processing resources in a server farm. Host computer 830 may be under the ownership or control of a service provider, or may be operated by the service provider or on behalf of the service provider. Connections 821 and 822 between telecommunication network 810 and host computer 830 may extend directly from core network 814 to host computer 830 or may go via an optional intermediate network 820. Intermediate network 820 may be one of, or a combination of more than one of, a public, private or hosted network; intermediate network 820, if any, may be a backbone network or the Internet; in particular, intermediate network 820 may comprise two or more subnetworks (not shown).

The communication system of FIG. 8 as a whole enables connectivity between the connected UEs 891, 892 and host computer 830. The connectivity may be described as an over-the-top (OTT) connection 850. Host computer 830 and the connected UEs 891, 892 are configured to communicate data and/or signaling via OTT connection 850, using access network 811, core network 814, any intermediate network 820 and possible further infrastructure (not shown) as intermediaries. OTT connection 850 may be transparent in the sense that the participating communication devices through which OTT connection 850 passes are unaware of routing of uplink and downlink communications. For example, base station 812 may not or need not be informed about the past routing of an incoming downlink communication with data originating from host computer 830 to be forwarded (e.g., handed over) to a connected UE 891. Similarly, base station 812 need not be aware of the future routing of an outgoing uplink communication originating from the UE 891 towards the host computer 830.

Figure 9:
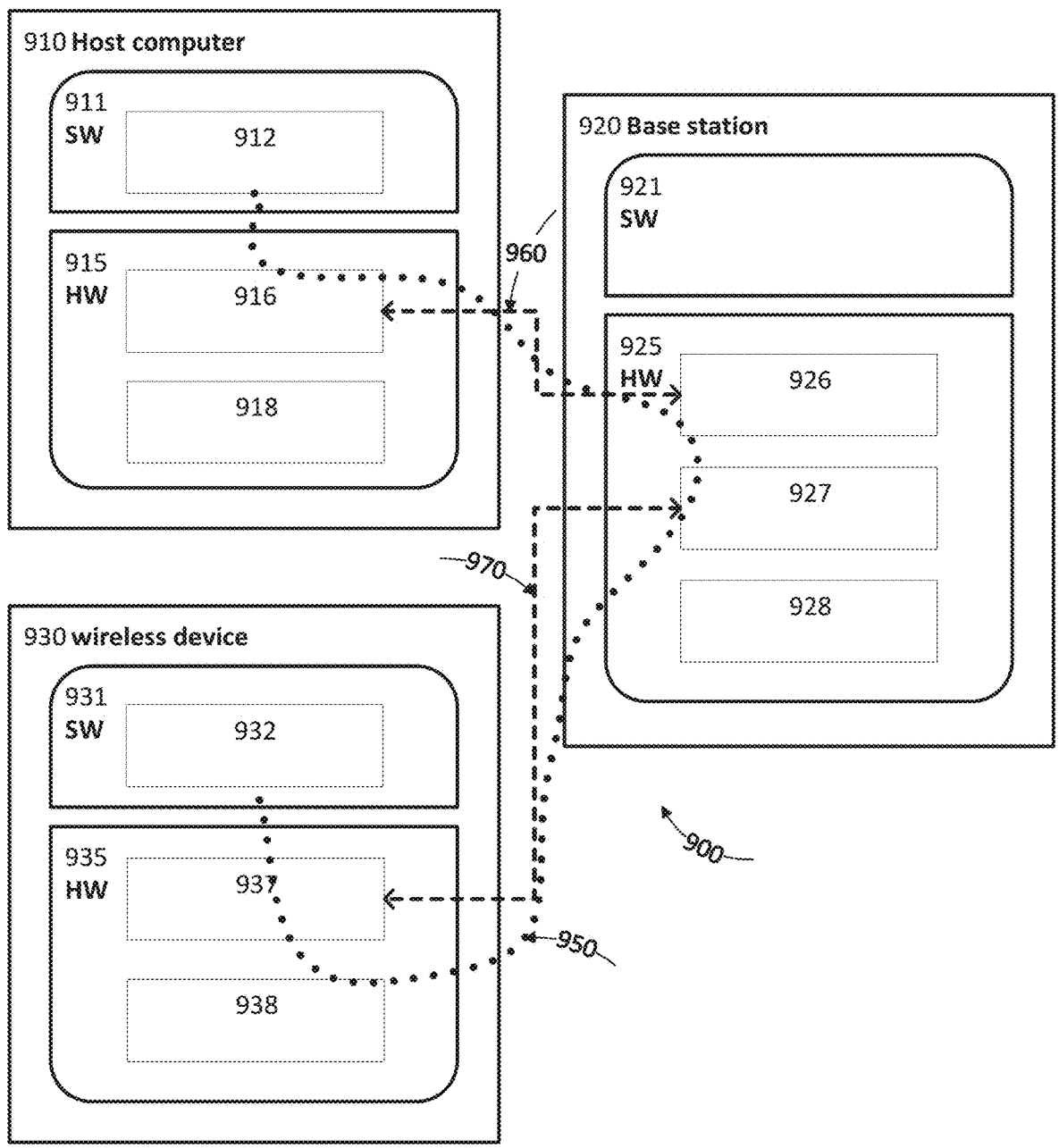
FIG. 9 shows a host computer communicating via a base station with a user equipment over a partially wireless connection in accordance with some embodiments of the disclosure.

In FIG. 9, OTT connection 950 has been drawn abstractly to illustrate the communication between host computer 910 and UE 930 via base station 920, without explicit reference to any intermediary devices and the precise routing of messages via these devices. Network infrastructure may determine the routing, which it may be configured to hide from UE 930 or from the service provider operating host computer 910, or both. While OTT connection 950 is active, the network infrastructure may further take decisions by which it dynamically changes the routing (e.g., on the basis of load balancing consideration or reconfiguration of the network).

Wireless connection 970 between UE 930 and base station 920 is in accordance with the teachings of the embodiments described throughout this disclosure. One or more of the various embodiments improve the performance of OTT services provided to UE 930 using OTT connection 950, in which wireless connection 970 forms the last segment. More precisely, the teachings of these embodiments may provide increased throughput through reduced interference and optimized spatial multiplexing, and hence improved overall network performance and data rates thereby providing more reliable and consistent service behaviour. Additionally, the improved UE SRS scheduling has the effect of reduced wireless device energy consumption which provides further support for OTT services by enabling extended levels of connectivity.

A measurement procedure may be provided for the purpose of monitoring data rate, latency and other factors on which the one or more embodiments improve. There may further be an optional network functionality for reconfiguring OTT connection 950 between host computer 910 and UE 930, in response to variations in the measurement results. The measurement procedure and/or the network functionality for reconfiguring OTT connection 950 may be implemented in software 911 and hardware 915 of host computer 910 or in software 931 and hardware 935 of UE 930, or both. In embodiments, sensors (not shown) may be deployed in or in association with communication devices through which OTT connection 950 passes; the sensors may participate in the measurement procedure by supplying values of the monitored quantities exemplified above or supplying values of other physical quantities from which software 911, 931 may compute or estimate the monitored quantities. The reconfiguring of OTT connection 950 may include message format, retransmission settings, preferred routing etc.; the reconfiguring need not affect base station 920, and it may be unknown or imperceptible to base station 920. Such procedures and functionalities may be known and practiced in the art. In certain embodiments, measurements may involve proprietary UE signaling facilitating host computer 910's measurements of throughput, propagation times, latency and the like. The measurements may be implemented in that software 911 and 931 causes messages to be transmitted, in particular empty or 'dummy' messages, using OTT connection 950 while it monitors propagation times, errors etc.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method of configuring a plurality of User Equipments (UEs) to communicate with a base station, the method comprising:
   determining, for each UE, a respective bandwidth based on an indication of channel quality between the UE and the base station, determining, for each UE, a respective bandwidth comprising determining, for each UE, the respective bandwidth for a respective reference signal to be transmitted by the UE;
   configuring at least a subset of the plurality of UEs to communicate with the base station based on the respective bandwidths, configuring the at least a subset of the plurality of UEs to communicate with the base station based on the respective bandwidths comprising selecting, for each UE of the at least a subset, a respective downlink transmission mode based on the respective bandwidths, and selecting, for each UE of the at least a subset, the respective downlink transmission mode based on the respective bandwidths comprising selecting, for each UE of the at least a subset, at least one of frequency division multiplexing (FDM) and spatial division multiplexing (SDM) for downlink transmissions to the UE based on the respective bandwidths;
   further comprising one or more of:

selecting, for each UE of the at least a subset, FDM for downlink transmissions if a total of the respective bandwidths is not greater than the total available bandwidth for simultaneous downlink transmissions to the plurality of UEs; and selecting SDM for downlink transmissions for at least two of the UEs of the at least a subset if a total of the respective bandwidths is greater than the total available bandwidth for simultaneous downlink transmissions to the plurality of UEs.

2. The method of claim 1, wherein determining, for each UE, a respective bandwidth comprises determining, for each UE, the respective bandwidth for a respective downlink signal from the base station to the UE.

3. The method of claim 1, comprising selecting SDM for at least two of the UEs of the at least a subset if downlink transmissions of the at least two of the UEs cannot be multiplexed using FDM.

4. The method of claim 1, wherein configuring the at least a subset of the plurality of UEs to communicate with the base station based on the respective bandwidths comprises configuring, for each UE of the at least a subset, the UE to transmit a reference signal based on the respective bandwidths.

5. The method of claim 4, wherein configuring, for each UE of the at least a subset, the UE to transmit a reference signal based on the respective bandwidths comprises, for each UE of the at least a subset:
allocating resources for the respective reference signal to be transmitted by the UE based on the respective bandwidth such that the respective reference signal having the respective bandwidth transmitted by the UE at a respective total transmission power is received at the base station with one of a signal-to-noise ratio (SNR) and signal-to-interference-and-noise (SINR) of at least a threshold value; and
configuring the UE to transmit the reference signal using the allocated resources.

6. The method of claim 5, wherein the threshold value comprises −15 dB.

7. The method of claim 5, wherein allocating, for each UE of the at least a subset, resources for the respective reference signal comprises selecting, for each UE of the at least a subset, at least one of a number of subcarriers for the respective reference signal and a frequency difference between a highest and a lowest subcarrier for the respective reference signal.

8. The method of claim 4, wherein the respective bandwidth is determined for each UE based on at least one of a total transmission power of the respective reference signal and a noise level at the base station.

9. The method of claim 1, wherein the indication of channel quality for each UE comprises an indication of path loss between the UE and the base station.

10. The method of claim 9, wherein the path loss for each UE comprises a path loss from the base station to the UE.

11. The method of claim 10, comprising determining the path loss for each UE from a respective measurement report from the UE.

12. The method of claim 1, wherein the method is carried out by the base station.

13. The method of claim 1, wherein, for each UE, uplink and downlink transmissions between the UE and the base station are time division multiplexed.

14. The method of claim 1, wherein configuring the at least a subset of the plurality of UEs to communicate with the base station based on the respective bandwidths comprises configuring the at least a subset of the plurality of UEs to communicate with the base station based on a sum of the respective bandwidths.

15. An apparatus for configuring a plurality of User Equipments (UEs) to communicate with a base station, the apparatus comprising processing circuitry and a memory, the memory containing instructions executable by the processing circuitry such that the apparatus is configured to:
determine, for each UE, a respective bandwidth based on an indication of channel quality between the UE and the base station, determining, for each UE, a respective bandwidth comprising determining, for each UE, the respective bandwidth for a respective reference signal to be transmitted by the UE;
configure at least a subset of the plurality of UEs to communicate with the base station based on the respective bandwidths, configuring the at least a subset of the plurality of UEs to communicate with the base station based on the respective bandwidths comprising selecting, for each UE of the at least a subset, a respective downlink transmission mode based on the respective bandwidths, and selecting, for each UE of the at least a subset, the respective downlink transmission mode based on the respective bandwidths comprising selecting, for each UE of the at least a subset, at least one of frequency division multiplexing (FDM) and spatial division multiplexing (SDM) for downlink transmissions to the UE based on the respective bandwidths;
further comprising one or more of:
selecting, for each UE of the at least a subset, FDM for downlink transmissions if a total of the respective bandwidths is not greater than the total available bandwidth for simultaneous downlink transmissions to the plurality of UEs; and
selecting SDM for downlink transmissions for at least two of the UEs of the at least a subset if a total of the respective bandwidths is greater than the total available bandwidth for simultaneous downlink transmissions to the plurality of UEs.

16. The apparatus of claim 15, wherein the apparatus comprises the base station.

17. A computer storage medium storing a computer program comprising non-transitory instructions which, when executed on at least one processor, cause the at least one processor to carry out a method of configuring a plurality of User Equipments (UEs) to communicate with a base station, the method comprising:
determining, for each UE, a respective bandwidth based on an indication of channel quality between the UE and the base station, determining, for each UE, a respective bandwidth comprising determining, for each UE, the respective bandwidth for a respective reference signal to be transmitted by the UE;
configuring at least a subset of the plurality of UEs to communicate with the base station based on the respective bandwidths, configuring the at least a subset of the plurality of UEs to communicate with the base station based on the respective bandwidths comprising selecting, for each UE of the at least a subset, a respective downlink transmission mode based on the respective bandwidths, and selecting, for each UE of the at least a subset, the respective downlink transmission mode based on the respective bandwidths comprising selecting, for each UE of the at least a subset, at least one of frequency division multiplexing (FDM) and spatial division multiplexing (SDM) for downlink transmissions to the UE based on the respective bandwidths;

further comprising one or more of:
 selecting, for each UE of the at least a subset, FDM for downlink transmissions if a total of the respective bandwidths is not greater than the total available bandwidth for simultaneous downlink transmissions to the plurality of UEs; and
 selecting SDM for downlink transmissions for at least two of the UEs of the at least a subset if a total of the respective bandwidths is greater than the total available bandwidth for simultaneous downlink transmissions to the plurality of UEs.

* * * * *